United States Patent [19]
Merritt et al.

[11] Patent Number: 5,705,902
[45] Date of Patent: Jan. 6, 1998

[54] HALBACH ARRAY DC MOTOR/GENERATOR

[75] Inventors: Bernard T. Merritt; Gary R. Dreifuerst, both of Livermore; Richard F. Post, Walnut Creek, all of Calif.

[73] Assignee: The Regents of the University of California, Oakland, Calif.

[21] Appl. No.: 383,287

[22] Filed: Feb. 3, 1995

[51] Int. Cl.$^6$ .................................................. H02P 7/00
[52] U.S. Cl. ........................... 318/254; 318/439; 310/156
[58] Field of Search ................................. 318/254, 439, 318/138; 310/154, 156, 152

[56] References Cited

U.S. PATENT DOCUMENTS

| | | | |
|---|---|---|---|
| 3,590,353 | 6/1971 | Kobayashi et al. | 318/254 |
| 4,429,263 | 1/1984 | Muller | 318/254 |
| 4,667,480 | 5/1987 | Bessler | 62/180 |
| 4,843,292 | 6/1989 | Ono et al. | 318/808 X |
| 4,998,052 | 3/1991 | Erdman et al. | 318/701 |
| 5,012,169 | 4/1991 | Ono et al. | 318/599 X |
| 5,349,258 | 9/1994 | Leupold et al. | 310/154 |

OTHER PUBLICATIONS

K. Halbach, Design Of Permanent Multipole Magnets With Oriented Rare Earth Cobalt Material, Nuclear Instruments And Methods 169 (1980).

K. Halbach, Physical And Optical Properties Of Rare Earth Cobalt Magnets, Nuclear Instruments & Methods, vol. 187, No. 1 (Aug. 1981).

K. Halbach, Application of permanent magnets in accelerators and electron storage rings (invited), J. of Applied Physics, vol. 57 (Apr. 1985).

*Primary Examiner*—Jonathan Wysocki
*Attorney, Agent, or Firm*—Henry P. Sartorio; John P. Wooldridge

[57] ABSTRACT

A new configuration of DC motor/generator is based on a Halbach array of permanent magnets. This motor does not use ferrous materials so that the only losses are winding losses and losses due to bearings and windage. An "inside-out" design is used as compared to a conventional motor/generator design. The rotating portion, i.e., the rotor, is on the outside of the machine. The stationary portion, i.e., the stator, is formed by the inside of the machine. The rotor contains an array of permanent magnets that provide a uniform field. The windings of the motor are placed in or on the stator. The stator windings are then "switched" or "commutated" to provide a DC motor/generator much the same as in a conventional DC motor. The commutation can be performed by mechanical means using brushes or by electronic means using switching circuits. The invention is useful in electric vehicles and adjustable speed DC drives.

28 Claims, 8 Drawing Sheets

HALBACH ARRAY DC MOTOR/ GENERATOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the generation of a dipole field using an array of permanent magnet bars, and more specifically, it relates to ironless electric motors and generators designed using the dipole Halbach array.

2. Description of Related Art

For many years Klaus Halbach has been investigating novel designs for permanent magnet arrays, using advanced analytical approaches and employing a keen insight into such systems. One of his motivations for this research was to find more efficient means for the utilization of permanent magnets for use in particle accelerators and in the control of particle beams. As a result of his pioneering work, high power free-electron laser systems, such as the ones built at the Lawrence Livermore National Laboratory, became feasible, and his arrays have been incorporated into other particle-focusing systems of various types.

In August 1979, K. Halbach authored a paper entitled "Design of Permanent Multipole Magnets with Oriented Rare Earth Cobalt Material." In this paper, he presented a novel method of generating multipole magnetic fields using non-intuitive geometrical arrangements of permanent magnets. In subsequent publications, he further defined these concepts.

SUMMARY OF THE INVENTION

It is an object of the present invention to provide electric motors and generators designed using the dipole Halbach array.

This design is an "inside-out" design as compared to a conventional motor/generator. The rotating portion, i.e., the rotor, is on the outside of the stator. The stationary portion, i.e., stator, is formed by the inside of the machine and is inserted down the axis of the dipole field. The cylindrical rotor contains an array of identical permanent magnets that provide a uniform dipole field. The windings of the motor are placed in or on the stator. The stator windings are then "switched" or "commutated" to provide a DC motor/ generator much the same as in a conventional DC motor. The commutation can be performed by mechanical means using brushes or by electronic means using switching circuits. The invention is useful in electric vehicles and adjustable speed DC drives.

Electric vehicle drive motors need to be rugged, low loss, and easy to control. A DC motor in general is easier to control than an AC motor. The Halbach array allows for the construction of an "ironless" motor thereby eliminating hysteresis and eddy current losses creating a very efficient motor. Efficiencies greater than 95 percent are possible. In conventional motors/generators using iron, the size of the airgap between stator and rotor dominates the machine design. Since the Halbach array provides a uniform field and no iron is required, the size of the airgap is no longer an important design parameter. This allows the motor design to be insensitive to airgap size allowing looser tolerances, which then provides for a less expensive, more rugged design. The more rugged, less expensive design coupled with greatly increased efficiency makes this a nearly ideal design for electric vehicle applications.

DETAILED DESCRIPTION OF THE INVENTION

Figure 1A:
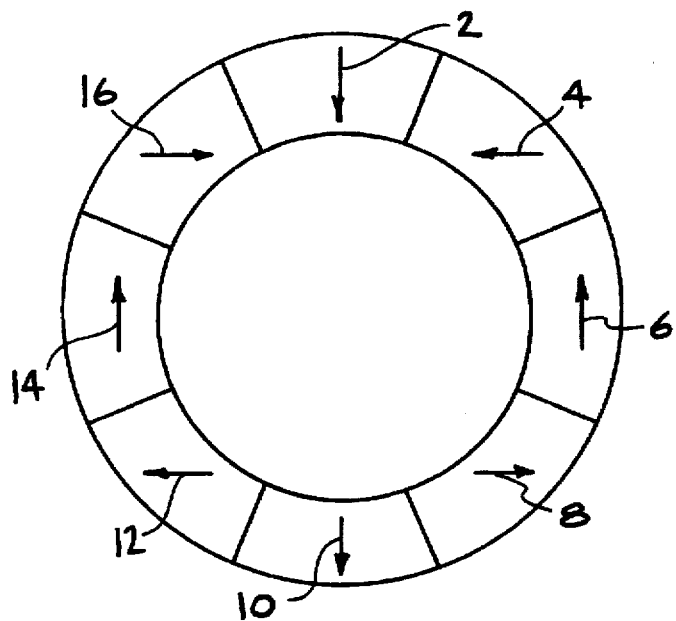
FIG. 1A (prior art) shows a cross section of a Halbach array.
Figure 1B:
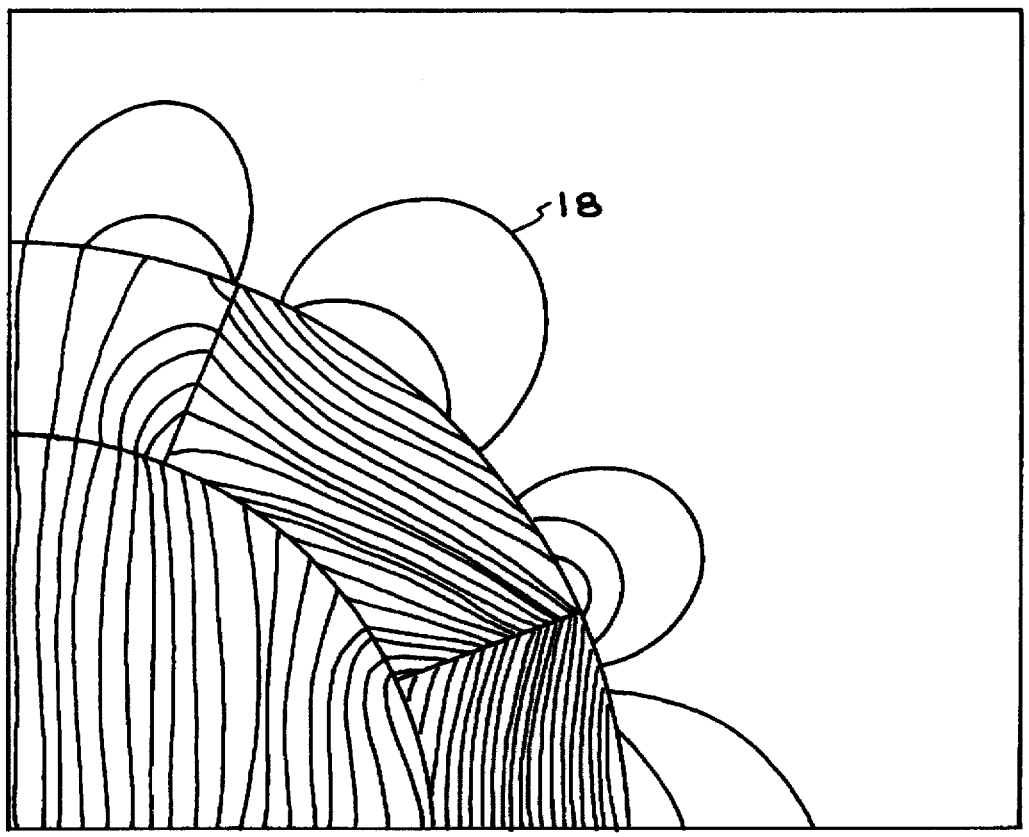
FIG. 1B (prior art) shows the field lines of the Halbach array of FIG. 1A.

Although electric machines can be constructed using multipole fields based on the techniques introduced by K. Halbach, the dipole field offers some unique advantages for the construction of a high speed electric machine. FIG. 1A shows an end view of a dipole Halbach array. The direction of magnetization of the bars are indicated at 2, 4, 6, 8, 10, 12, 14 and 16. FIG. 1B shows one quadrant of the computed lines of force 18 produced by the array. Note the highly uniform field inside the array, and the near-cancellation of the field outside the array.

Except near the ends of the array, or very near its inner surface, the dipole field inside a such an array is given by the expression derived by Halbach:

$$B_0 = B_r C_N \ln(r_2/r_1) \tag{1}$$

with $r_1$ and $r_2$ indicating the inside and outside radius of the magnet array, respectively, and $B_r$ representing the remanant field of the permanent magnet material. If M is the number of segments in the magnet, $$C_N = \sin(2\pi/M)/(2\pi/M) \tag{2}$$

giving $C_N = 0.90$ for $M=8$ and $C_N = 0.97$ for $M=16$.

When Equations (1) and (2) are compared with a computer code using the correct remnant field of the magnets, the code results agree within a percent or two of the analytical result. Arrays constructed using the high-field material, NdFeB, have measured fields that are found to be within a few percent of the predicted values.

Figure 2:
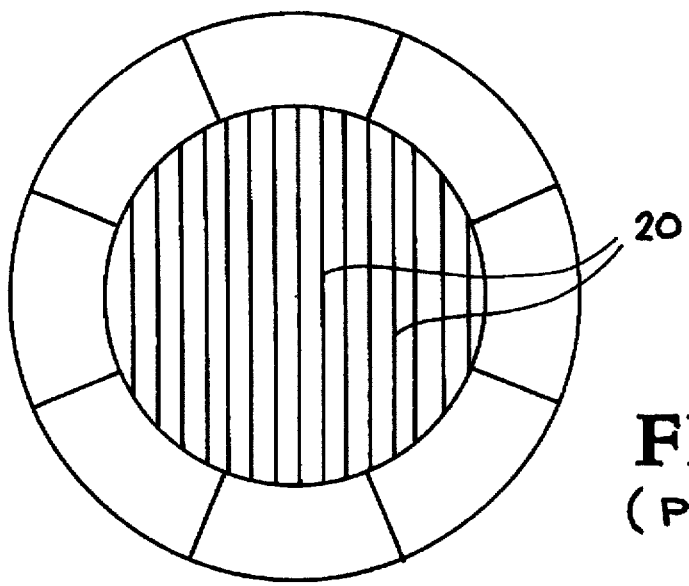
FIG. 2 (prior art) shows the Halbach array field.

FIG. 2 is a field plot of a dipole field 20 constructed using an eight segment Halbach array. The permanent magnets used for this dipole were ceramic; the field values measured are uniform to about three percent. The values for the field strength are those measured inside the Halbach array cylinder; the field decreases somewhat near the ends of the magnet array.

In order to construct a motor/generator, a single or multi-phase winding is inserted down the axis of the dipole field and relative motion is provided between the field and the winding(s). Relative rotation then generates a voltage in the winding that is linearly related to the product of the rotation speed and the amount of flux intercepted by the winding. In the case of a generator, the work performed in sustaining the relative motion between the windings and the field is transformed directly into ac electrical energy that flows out of the machine. Conversely, ac electrical energy flowing into the winding, if at the proper frequency and phase, is transformed into mechanical work that causes a relative motion between the windings and the field. At this point it is important to note that only a relative motion between the windings and the field is required; electric machines having either the windings or the Halbach array in motion could be constructed. There are advantages to each type depending upon the application.

Figure 3:
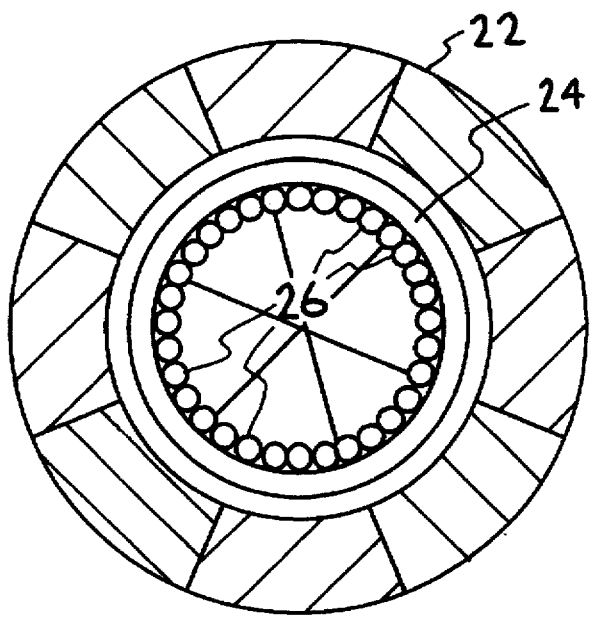
FIG. 3 shows a Halbach array with a three phase winding.

FIG. 3 shows a three phase winding inserted into the Halbach array field. The Halbach array has eight magnet segments 22, a barrier 24 and a Litz wire winding 26. Single phase or higher phase number machines can also be constructed. This application concentrates on the three phase machine in which the dipole Halbach array surrounding the winding is rotating. This configuration has been employed in the application for which it was first proposed, electromechanical batteries (flywheel energy storage modules).

In order to calculate the induced field, consider first the simple case of a single turn winding. Assume for the moment that the winding is stationary and that the Halbach field, due to the relative motion, is given by $$B(t) = B_0 \cos(\omega t) \tag{3}$$

Owing to the linearity of the system the induced voltage is given by $$V(t) = d\phi/dt, \tag{4}$$

where $\phi$ is simply given by the product of the dipole magnetic field strength and the area, A, intercepted by the windings (with a small correction, usually of order 10 to 20 percent, depending on the relative length of the windings and the magnets) for the fall-off of the field strength near the ends of the magnet array. This expression then reduces to $$V(t) = B_0 A \omega \sin(\omega t) \tag{5}$$

where A is the area of the winding, i.e., its length multiplied by its transverse width, and $\omega$ is the rotational velocity in radians per second.

For the case of multiple turns per winding, the voltage becomes $$V(t) = KNB_0 \omega \sin(\omega t) \tag{6}$$

where N is the number of turns and K is a geometric constant, close to unity, that accounts for the fact that the winding now has some physical width that spans an arc along the circumference of the cylinder upon which the windings are attached. This constant is readily calculated; it accounts for the relative decrease in magnetic field since a particular turn is no longer exactly aligned with the reference direction for the magnetic field. For such a turn the correction factor is equal to $\cos\beta$, where $\beta$ is the angle between the reference for the magnetic field, usually zero, and the angle at which a particular turn resides. For a distributed winding with angular spread $\alpha$ (i.e. its two sides intercept a fraction $2\alpha/2\pi$ of the circumference), upon performing the average over this spread the factor K is given by the following expression:

$$K = 2\sin(\alpha/2)/\alpha \tag{7}$$

If $\alpha = 30°$, for example, K=0.989.

Figure 4:
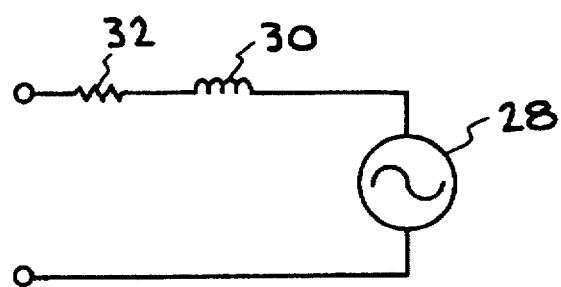
FIG. 4 shows an equivalent circuit for an electric machine on a per phase basis.

FIG. 4 is a schematic of an equivalent circuit for a single phase of the electric machine. It is to be interpreted on a per phase basis for machines having multiple phases. This circuit consists of an alternating current generator 28, and inductor 30 and a resistor 32. Note that this representation contains only linear elements, and also note that the value of magnetic field $B_0$, that is to be used in calculating the induced voltage, is that of the Halbach array. In this ironless system, and for all feasible values of the winding currents, there is no "back reaction" between the stator windings and the inducing magnetic field. There is, of course, an effect of the winding inductance on the output voltage as well as the usual resistive drop. However, since the system is ironless, inductances are low, and with good design, the resistive drops are also low. As will be shown, not only is the power output very high, but the efficiency is also typically much higher than that of an iron-core machine of comparable physical size.

The equations for torque are also straightforward. Consider again the case of a single turn winding and only one phase. The vector force on a conductor is given by $$F = 2I(L \times B) \tag{8}$$

where I is the current in the conductor, L is the vector path along the conductor and B is the vector magnetic field. The torque is then $$T = r \times F, \tag{9}$$

where r is the radius.

For a single turn rectangular winding with longitudinal length L, in a dipole field, the magnitude of the peak torque becomes $$T = 2rLIB_0 \tag{10}$$

and for the multiple turn case, the peak torque becomes $$T = 2rLIB_0KN, \tag{11}$$

where K is the geometric factor as before and N is the number of turns.

Owing to the complete linearity of this ironless system these simple equations form an adequate basis for the design of motor/generator systems employing a dipole Halbach array. The circuit-related factors that must be employed in order to calculate the output power and the efficiency of such generators are discussed infra. Again, as noted, the absence of iron in the magnetic circuit means that only simple air-core inductances and winding resistances must be taken into account to calculate these quantities.

If the rms output voltage of each of the 3-phase windings is $V_0$, the winding inductance is $L_0$, and its resistance is $R_0$, then the output power of each phase into a resistive load with resistance $R_L$ is given by the equation:

$$P = \frac{(V_0)^2}{R_L} \left\{ \frac{1}{[1+(R_0/R_L)]^2 + (\omega L_0/R_L)^2} \right\}, \text{Watts/phase} \quad (12)$$

The efficiency is then given by the expression:

$$\eta = \frac{R_L}{R_0 + R_L} \quad (13)$$

A fundamental advantage of a machine of this type is the fact that it can be constructed without the use of magnetic material other than the permanent magnets. There is no need for laminations or back iron. This has two major advantages. First the conventional core loss and eddy current loss in the laminations or back iron does not exist. The only loss in the machine will be losses in the windings. The second advantage is since there is no back iron or laminations required, the machine is inherently lightweight.

The uniform field also results in several important advantages. Since the field is truly uniform, the machine design is no longer constrained by the airgap size. This offers the opportunity to solve other system issues. For example, in the modular EMB application, it allows a vacuum barrier to be placed between the windings and the Halbach array without appreciable degradation of machine performance.

The field uniformity of the dipole Halbach array has another, very important result for the extraction of very high peak powers over short time scales. Conventional generators employing narrow gaps and iron laminations have a problem that is not encountered here. In such systems, where the drag torque caused by the power is a function of the gap spacing, there can exist a strong tendency to drive the rotating system into so-called "whirl" instability. Contrast this with our situation. Since the field is uniform, the torque is not a function of the displacement of the windings relative to the field (the windings only "know" that they are in a uniform rotating field, origin "unknown"). Thus the potential, from this source, for whirl instability does not exist.

As mentioned earlier, the major loss mechanism in this type of machine is the losses in the windings. These losses can be minimized by increasing the amount of copper in the windings. There is a trade-off between the efficiency of the machine and the size of the winding. There is also a potential loss due to eddy currents in the conductors; since the field is always present, eddy currents will be induced in the conductors due to the relative motion between the windings and the field. This latter loss is easily controlled to low levels, i.e. a few watts, by the use of Litz wire.

Halbach array electric machines could be constructed in a conventional manner, whereby the Halbach array is stationary and the windings rotate within the array. As mentioned for use in the modular EMBs, the Halbach array machine has been constructed "inside out", with the windings stationary and the magnet array rotating around the windings. There are advantages to both types of construction; specific applications drive the choice.

In a conventional machine configuration, the Halbach array machine would look physically much like a dc machine; that is, the armature is on the rotor and the field is stationary. Such a machine could be operated as either a dc or ac device. If one uses slip rings to bring out the windings, the machine could be characterized as an ac machine. However, if now an electronic commutation circuit is added, the Halbach array machine can be characterized as a dc machine. If one desired, one could use a mechanical commutator as well.

The inherent advantage of this construction technique is that the inertia of the rotor is dominated solely by the mass of the windings since there are no laminations required. One can therefore envision the construction of a very high speed low inertia machine.

The windings are stationary and readily accessible in a machine configured in an "inside-out" geometry. Again, the machine can be characterized as either an ac or dc machine. The primary advantage of the inside-out construction is that it is readily adapted to evacuated systems (such as in our EMB) since there is no need for slip rings.

As noted earlier, the impetus for the development of this new type of electric machine was our application to modular electromechanical batteries. The EMB battery consists of a high-speed flywheel with an integral motor/generator suspended on magnetic bearings and in an evacuated housing. For practical use, a set of power electronics is coupled to this module. The flywheel and its motor/generator is a means for energy storage and extraction; the power electronics conditions electrical energy, both for adding energy to and extracting energy from the flywheel. Since the goal is to mimic a battery, the input/output voltage to the power electronics is typically dc, although ac-based systems can also be contemplated, using so-called cycloconverters, or the multiphase devices called matrix converters.

Figure 5:
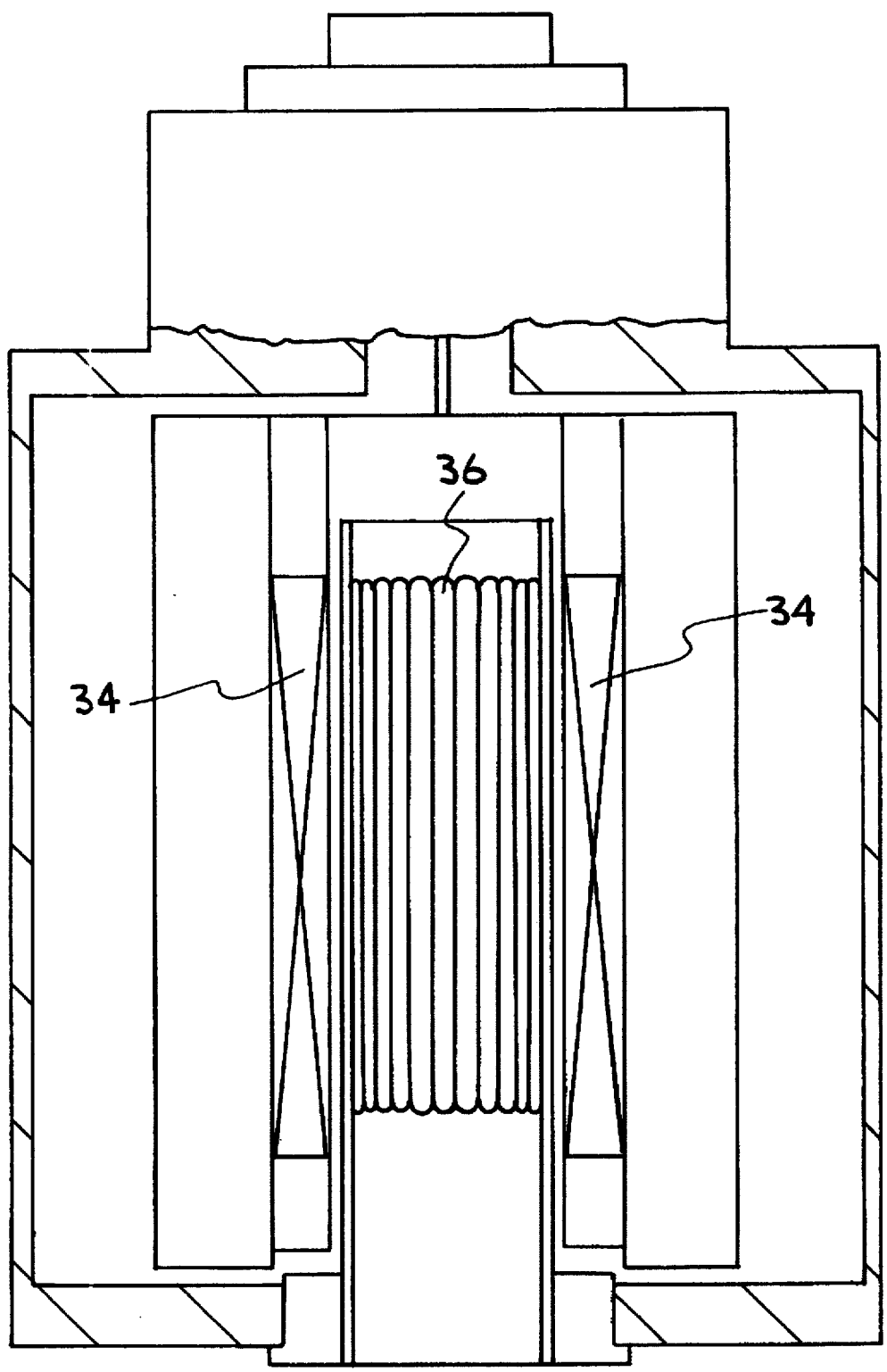
FIG. 5 shows an electromechanical battery.

As can be seen in FIG. 5, the Halbach array machine is an integral part of the flywheel construction. The array of magnets 34 is designed into the rotor; the mass of the magnets is used advantageously to keep the composite material in compression. The advantages listed above are also utilized in this design. The outer diameter of the stator windings 36 are typically a centimeter smaller than the inner diameter of the Halbach array magnets 34. In this space, a thin vacuum barrier is placed, still allowing for a substantial clearance between the array and the barrier. This clearance simplifies the design of the bearing/suspension system, which need not constrain the radial displacements of the rotor assembly to the fraction-of-a-millimeter tolerances that would be required in a conventional iron-core machine.

A summary of the design parameters of one modular EMB follows.

TABLE 1

| Electromechanical Battery Parameters | |
|---|---|
| Useful Energy (100% to 50% speed) | 0.6 kW-hr |
| Max Speed | 84,000 RPM |
| Peak Power | 50 kW |
| Open Circuit Voltage | 151 Vrms/phase at max speed |
| Halbach Array Length | 18 cm |
| Halbach Array Outer Diameter | 10.5 cm |
| Halbach Array Inner Diameter | 7 cm |
| Winding - Turns/phase | 6 |
| Conductor size | 1700 strand, #40 Litz |
| Inductance per phase | 7.4 microhenries |
| Resistance per phase | 10.8 milliohms |

Using these data and equations (12) and (13), the power output and the efficiency of this generator can be calculated.

It is assumed that the power from each of the three phases is summed independently in calculating the output power. Also, the eddy current losses in the Litz wire (it is of order one or two Watts) are ignored. In the table below the power and efficiency are calculated as a function of the load resistance (the same for each of the three phases) and at full speed (84,000 RPM). As will be seen at or below the design power the efficiencies are very high.

TABLE 2

Generator Efficiency Versus Output Power

| $R_L$ (Ohms) | Power (kW) | Efficiency |
| --- | --- | --- |
| 3.0 | 23 | 0.9964 |
| 2.5 | 27 | 0.9957 |
| 2.0 | 34 | 0.9946 |
| 1.5 | 45 | 0.9929 |
| 1.0 | 66 | 0.9893 |

Although the Halbach array machine can be operated as either an ac or dc machine, there are advantages in operating it as a dc machine. The primary advantage is that the drive circuitry can use a simple 120° gating waveform. Normally, in an ac machine, elaborate PWM techniques are used to generate sinusoidal waveforms in order to minimize harmonics that can cause losses in the laminations. Since the Halbach array machine does not have laminations this is no longer of concern. The resulting drive can then be greatly simplified, since in this case a simple rectangular wave is very nearly as efficient in driving the rotor as would be a pure sine wave.

In this invention, energy is transferred into and out of the flywheel on a routine basis. In order to add energy to the flywheel, the power electronics treat the Halbach array machine as an electronically commutated dc motor, as the voltage is raised across the motor, the speed of the motor increases. A schematic of the power electronics for spin-up is given in FIG. 6. The electronic commutation is provided by six switches: 38, 40, 42, 44, 46 and 48, which may comprise six insulated gate bipolar transistors (IGBTs), BJTs, FETs, GTOs, or MCTs, connected to the three phases: 50, 52 and 54, of the Halbach motor 49. The dc voltage, represented by battery 56, to the commutating bridge is controlled by the "buck" regulator 58 formed by one IGBT 60, an inductor 62, a diode 64 and a capacitor 66. The IGBTs in the commutation bridge 37 also serve as an overcurrent protection scheme. The lower IGBT in each leg can be pulse width modulated to control the current in the windings. The switching frequency for this modulation is about 20 kHz, while the electronic commutation needs to accommodate frequencies up to 1400 Hz to achieve 84,000 RPM operation. This protection is not for the windings but for the power semiconductors.

Figure 6:
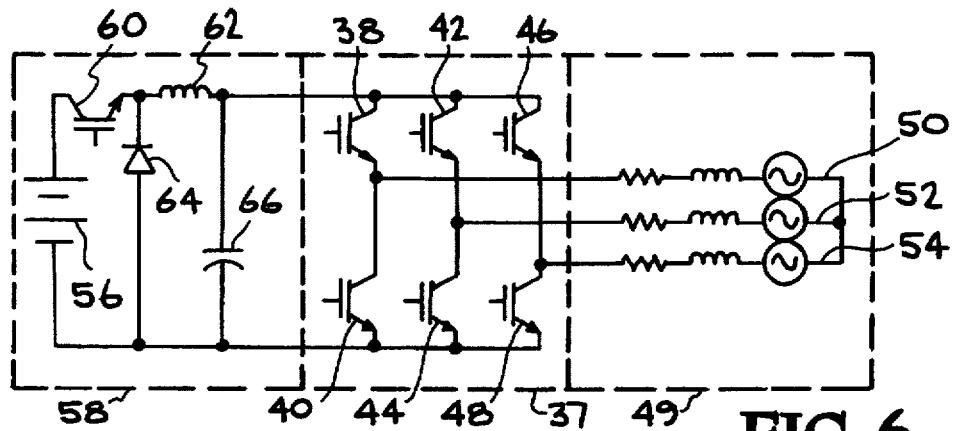
FIG. 6 shows a simplified schematic of a spin-up circuit.

As shown in FIG. 6, Buck regulator 58 comprises IGBT 60; diode 64, capacitor 66 and inductor 62. The Buck circuit provides for a variable voltage across capacitor 66 by changing the duty cycle of IGBT 60. The electronic commutator 37 is connected in parallel with the regulator 58. One winding each of the windings 50, 52 and 54 of Halbach motor 49 are connected to one branch of the electronic commutator 37 between the series connected IGBTs.

Figure 7:
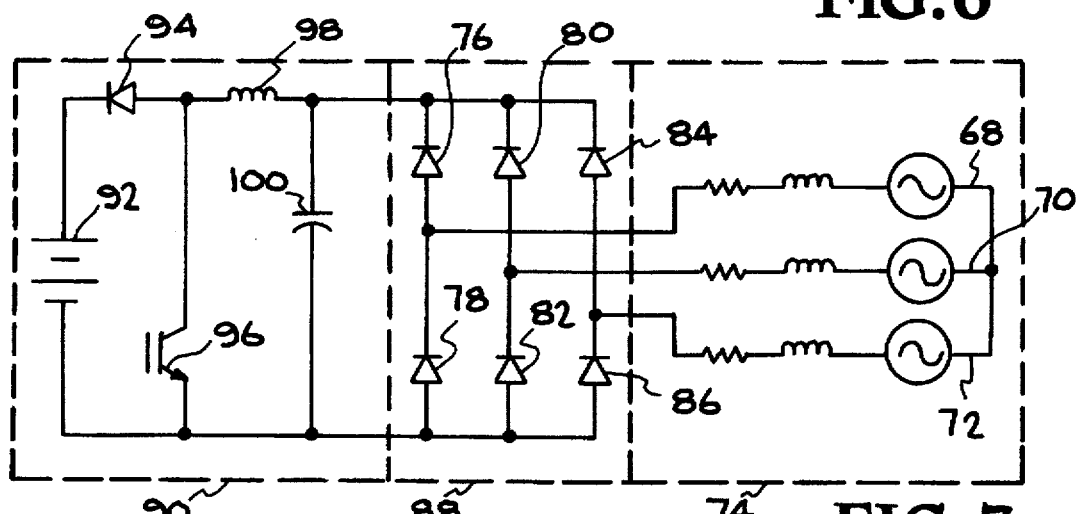
FIG. 7 shows a simplified schematic of an energy extraction circuit.

A schematic for extraction of power from the flywheel is given in FIG. 7. The three phases: 68, 70 and 72, of the windings of the Halbach Generator 74 are connected to a six pulse diode bridge 88 comprising diodes 76, 78, 80, 82, 84 and 86 to convert the ac waveforms to dc. Since the speed changes a factor of two while energy is being extracted the dc voltage will also decrease by a factor of two. To accommodate this change in dc bus voltage a "boost" regulator 90 is added. This regulator comprises battery 92, diode 94, IGBT 96, inductor 98 and capacitor 100. The boost circuit provides for a constant output voltage by changing the IGBT duty cycle.

As shown in FIG. 7, Boost regulator 90 has in parallel: DC voltage source 92 in series with diode 94, IGBT 96 and capacitor 100. An inductor 98 is electrically connected between IGBT 96 and capacitor 100. Diode bridge 88 has three parallel branches electrically connected in parallel with capacitor 100. Each branch of diode bridge 88 has two series connected diodes. Windings 68, 70 and 72 are electrically connected to a separate branch between the two series connected diodes of that branch. The circuit shown in FIG. 7 is for extracting energy from the Halbach generator 74.

Figure 8:
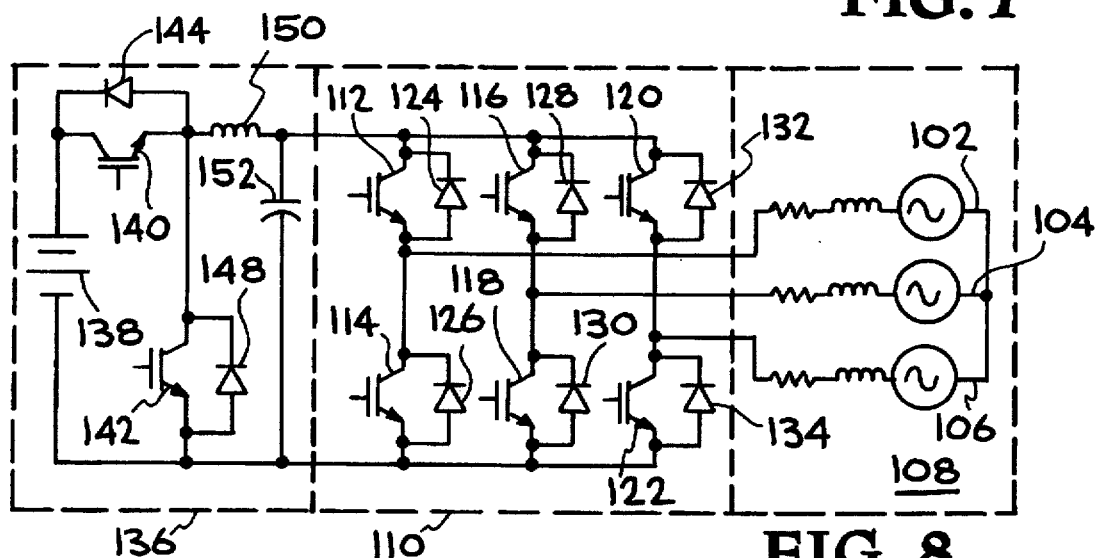
FIG. 8 shows a simplified schematic of power electronics for an electromechanical battery.

Since IGBTs are normally packaged with an antiparallel diode, the spin-up and extraction circuit can be combined to one as shown in FIG. 8. This circuit works best when the energy is added to the flywheel on the same time scale as it is extracted. FIG. 8 is an example of a circuit that creates a true electromechanical battery; the flywheel-power electronics system mimics a dc battery. For those applications where energy compression is important, that is, the energy is added/extracted on a much longer time scale than it is extracted/added, there is a cost advantage to separate the spin-up and extraction functions in order to minimize the cost of the power semiconductors. FIG. 8 comprises three phases: 102, 104 and 106 of the Halbach machine 108, connected to electronic commutator 110 which comprises six IGBTs: 112, 114, 116, 118, 120 and 122, where each IGBT has an antiparallel diode: 124, 126, 128, 130, 132 and 134. Buck/Boost regulator 136 comprises DC voltage source 138, IGBTs: 140 and 142, where each IGBT has an antiparallel diode 144 and 148. Regulator 136 further comprises inductor 150 and capacitor 152.

As shown in FIG. 8, Buck/Boost regulator 136 has three parallel branches. One branch has DC voltage source 138 in series with IGBT 140 which has an antiparallel diode 144. Another branch has an IGBT 142 with an antiparallel diode 148. The third branch has a capacitor 152. Inductor 150 is between IGBT 142 and capacitor 152. Electronic commutator 110 is connected in parallel with regulator 136 and has three parallel branches. Each branch has two series connected IGBTs with antiparallel diodes. One phase each of three phase Halbach machine 108 is connected to each branch between the two series connected IGBTs.

The flywheel system has been operated at speeds exceeding 57,000 rpm, verifying the fundamental characteristics of the Halbach array electric machine.

Figure 9A:
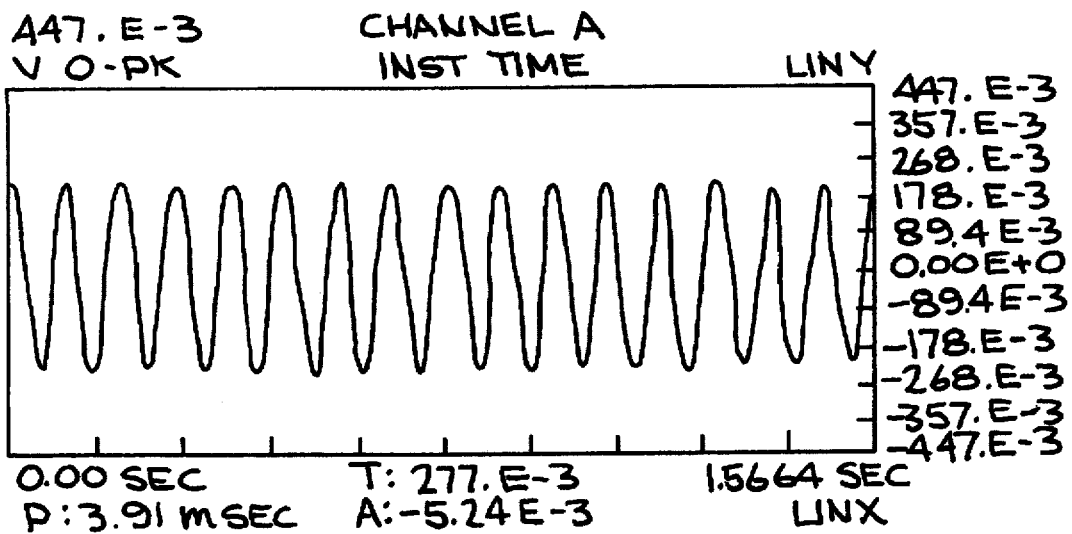
FIG. 9A shows the open circuit voltage waveform.
Figure 9B:
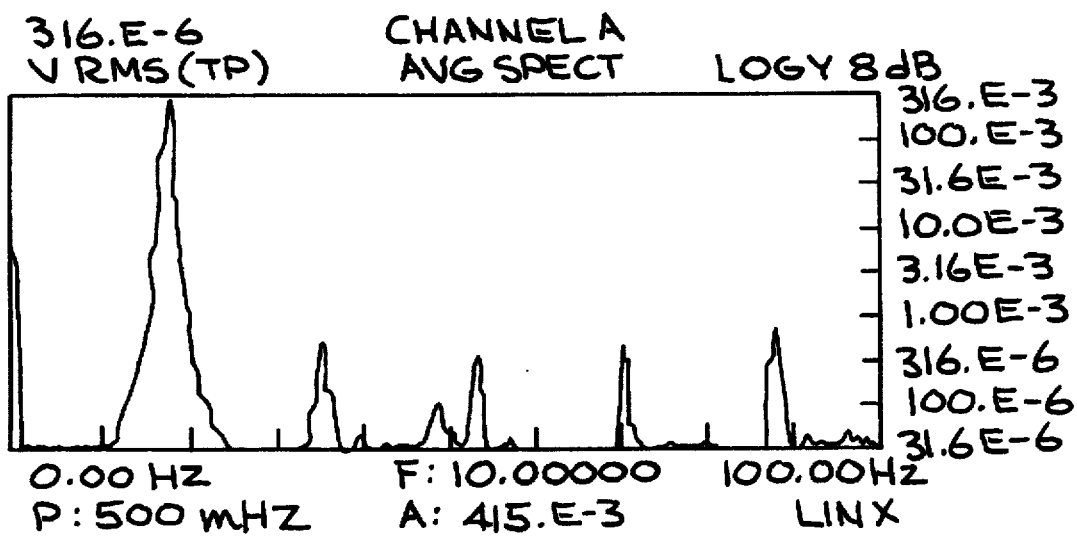
FIG. 9B shows the purity of the sinusoid of the waveform of FIG. 9A.

FIG. 9A is a typical open circuit voltage waveform; the purity of the sinusoid is given in FIG. 9B which shows that the highest amplitude harmonic is less than a factor of 300 than the fundamental (i.e., more than 50 decibels lower).

Figure 10:
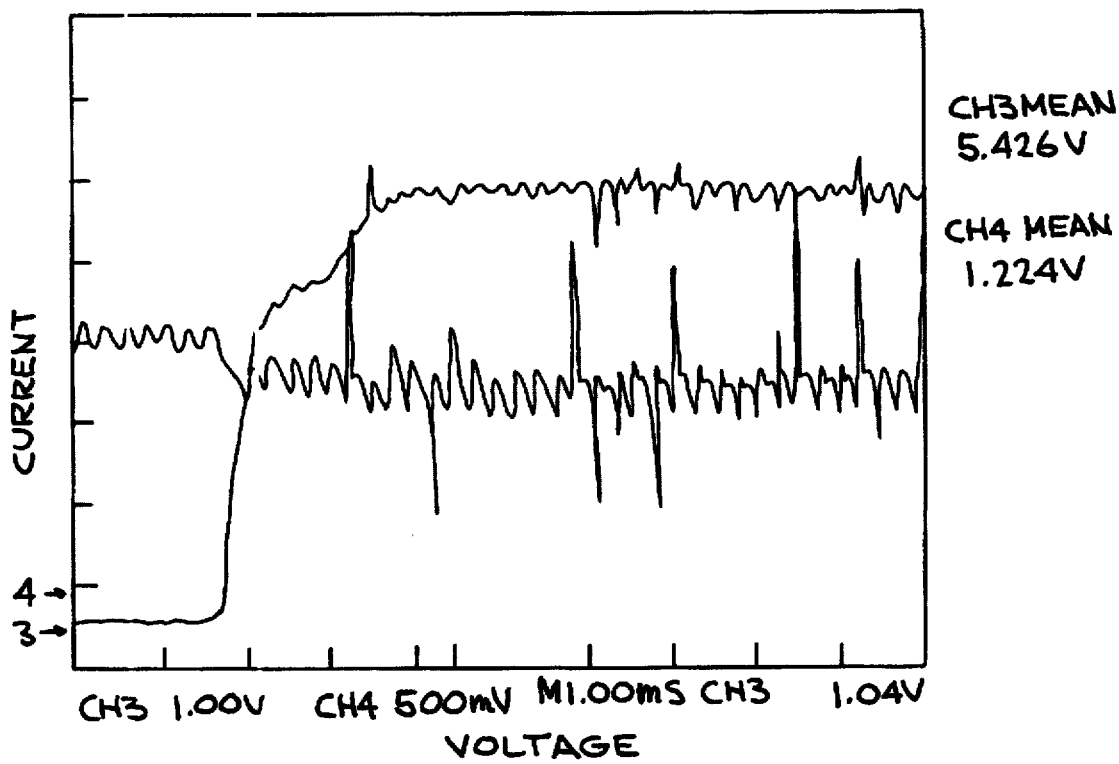
FIG. 10 shows bridge current and voltage during extraction.

Using the flywheel with an integral Halbach array machine, over 100 kW of power (into a load that was not impedance-matched for maximum power) in about one second bursts have been successfully extracted. During this high peak power, the machine did not exhibit any indications of whirl instability. To perform this extraction, the windings were connected to a six pulse diode bridge that was then switched into a resistive load. FIG. 10 shows typical bridge voltage and current during extract-ion. The peak power that has been extracted to date was 115 kW for about one second.

Figure 11:
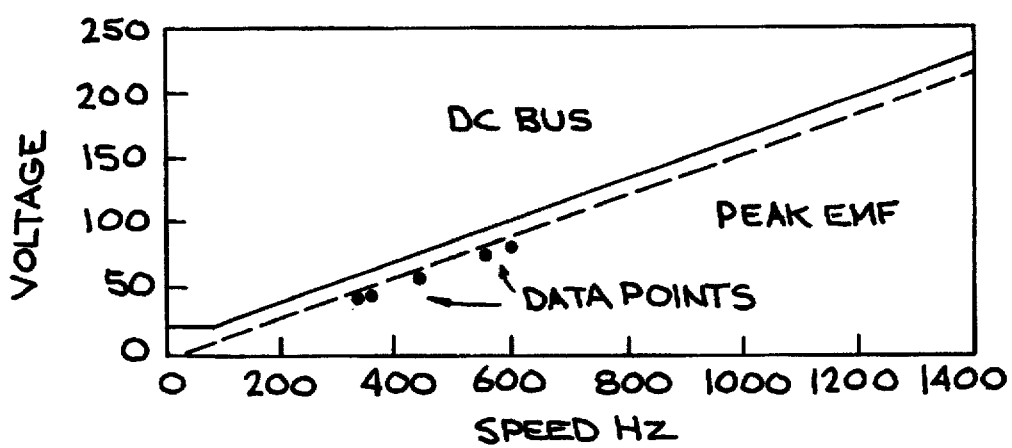
FIG. 11 is a graph of flywheel speed versus DC bus voltage.

The flywheel with an integral Halbach array machine has been routinely operated at 40,000 RPM. During the spin-up, a single phase version of the power electronics as shown in FIG. 6 was used. FIG. 11 is a plot of speed versus dc bus voltage. The dc bus voltage is always slightly higher than the EMF to ensure power flow into the motor during spin-up. This operation is typical of a dc motor with constant excitation.

Figure 12A:
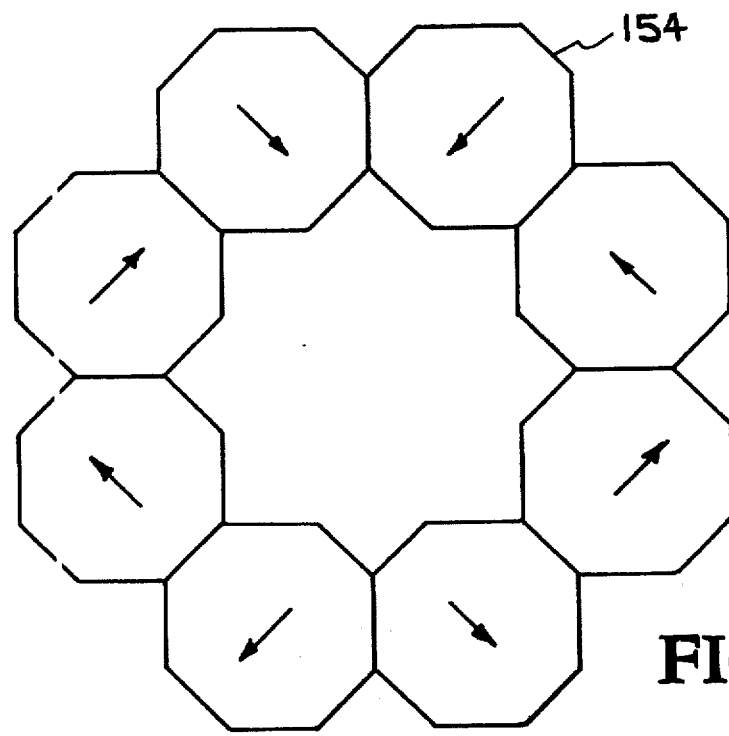
FIG. 12A shows an array of octagonal bars.
Figure 12B:
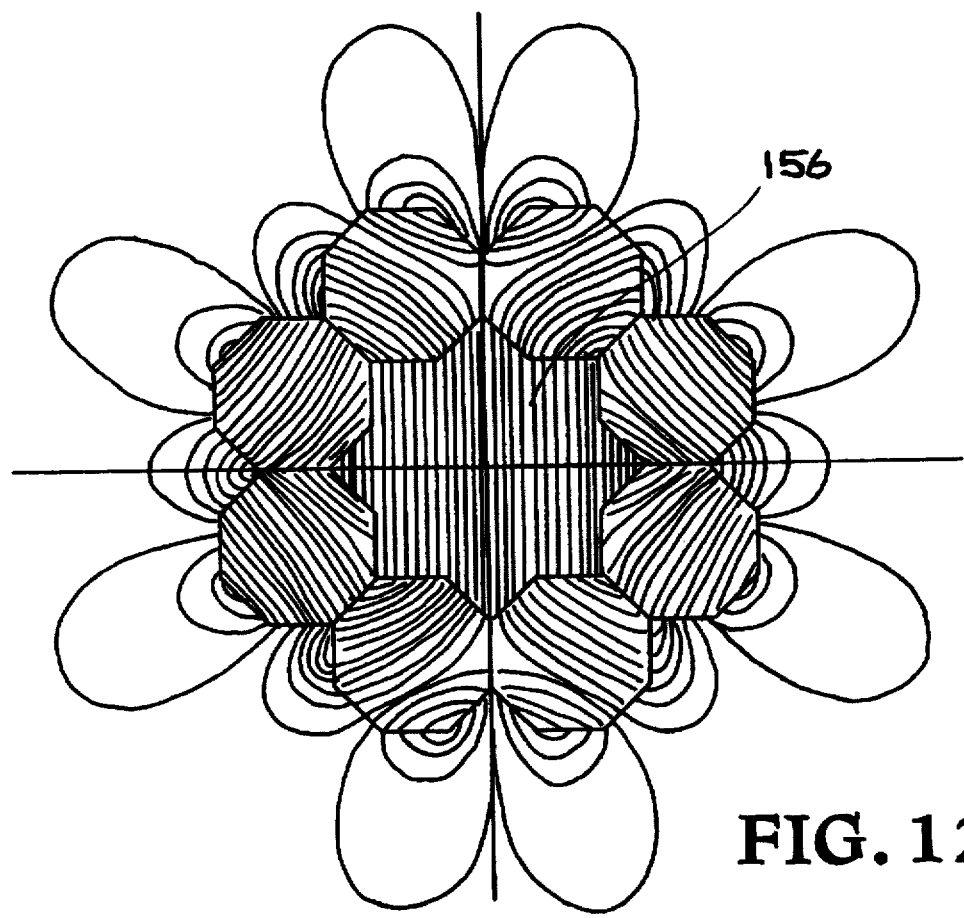
FIG. 12B shows the magnetic field of the array of FIG. 12A.

In another embodiment of the present invention, Halbach's pie-shaped (or trapezoidal) magnet bars are replaced with their special (and differing) magnetization directions, with polygonal (square, octagonal, etc.) bars all of which are identical. These bars are then assembled in a circular array wherein only the direction of magnetization is varied, stepwise, to satisfy the theoretical criterion described above, i.e., that the bars are dipole elements having a vector direction of magnetization that rotates at twice the rate of a vector that points from the center of the dipole field to the center of the element. The symmetry of these bars is such as to allow the satisfaction of this criterion. To illustrate the concept, an array of octagonal bars 154 is shown on FIG. 12A. As can be seen in FIG. 12B, the field 156 is quite uniform, and there is strong cancellation of the field outside the array. As can also be seen, the octagonal shape allows for rotation of the direction of magnetization through 90 degrees while the angular position of the magnet bar in the array rotates through only 45 degrees. In the case of a twelve-sided polygon, the magnetization would rotate through 60 degrees as the angular position of the bar rotated through 30 degrees. In the case of a square, the matching between elements would not be as symmetric as in the other two cases, but 90 degree rotations, since they leave the geometry invariant, would allow one to construct an array that would satisfy the requirement. In another embodiment, the identical permanent magnets are bars with circular cross-section. Each bar is marked with a fiducial to indicate the direction of magnetization.

It should be noted that it is not necessary for the elements to touch each other at their edges in order to generate an acceptable dipole field. Since this is an ironless system, leaving gaps should only reduce the field, in rough proportion to the volume of the gaps removed as compared to the volume of magnet material. As long as they are reasonably small and symmetrically located, such gaps should not markedly affect the uniformity of the dipole field that is produced inside the array. It follows that bars of circular cross-section might also be used, if there were appropriate fiducial marks to indicate the direction of magnetization at the time of assembly. This embodiment has application in energy stage systems for computers or for load-leveling applications. Other uses include electric vehicles, compute back-up power, particle acceleration magnets and magnetic resonance imaging systems.

Figure 13:
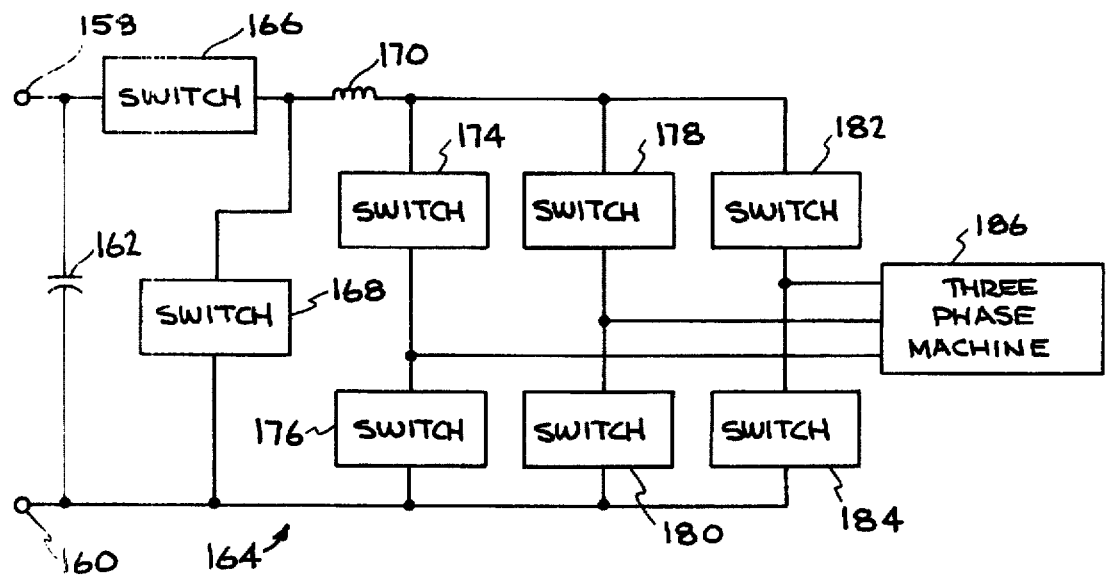
FIG. 13 is a generalized view of a current source converter for addition/extraction of energy from the electric machine.
Figure 14:
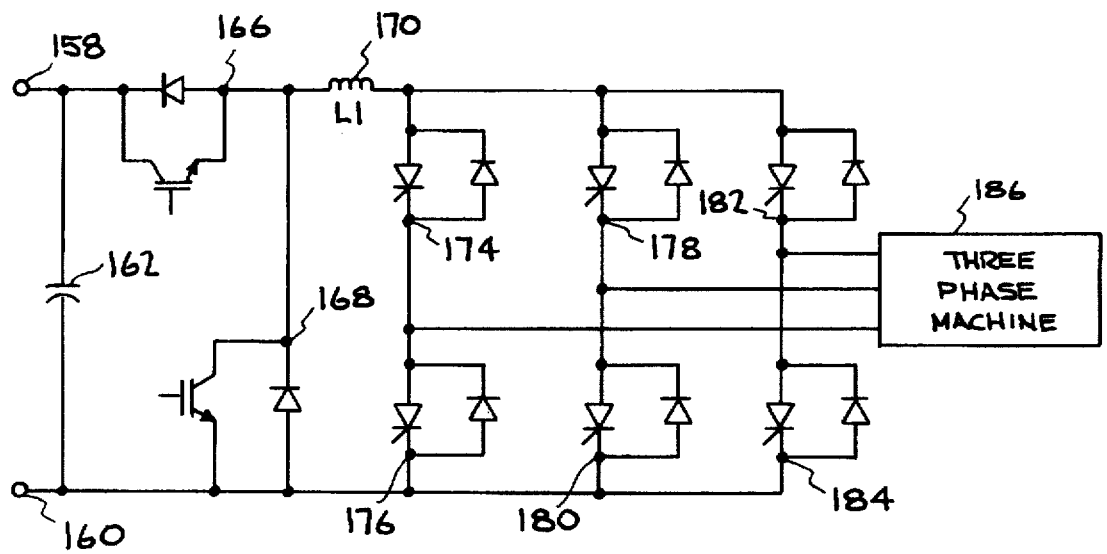
FIG. 14 is a specific embodiment of the current source converter of FIG. 13.

FIG. 13 shows a generalized version of a current source converter of the electric machine. Nodes 158, 160 and capacitor 162 are used for addition and extraction of the electric machine energy. A three node regulator has switch 166, switch 168 and inductor 170. Regulator 164 is electrically parallel to capacitor 162. An electronic commutator is electrically parallel to the regulator, and has three parallel branches, each branch having two switches (174, 176, 178, 180, 182 and 184) with a connection to a single phase of three phase machine 186. FIG. 14 shows a specific embodiment of the current source converter of FIG. 13, where switches 166 and 168 each comprise an IGBT with an antiparallel diode. Switches 174, 176, 178, 180, 182 and 184 each comprise a Zener diode with an antiparallel diode.

Changes and modifications in the specifically described embodiments can be carried out without departing from the scope of the invention, which is intended to be limited by the scope of the appended claims.

We claim:
1. An electric machine, comprising:
   a cylindrical rotor comprising an array of permanent magnets that provide a uniform dipole field with no necessity for the use of laminated iron, wherein said array of permanent magnets comprise bars of identical permanent magnets assembled in a circle, wherein said bars are dipole elements, each bar of said bars having a vector direction of magnetization that rotates at twice the rate as that of a vector rotating about said circle pointing from the center of said uniform dipole field to the center of said elements;
   a stator inserted down the axis of said dipole field, said stator comprising windings; and
   means for commutating said windings;
   wherein said rotor is on the outside of said stator.
2. The electric machine of claim 1, wherein said bars are selected from a group consisting of square bars, octagonal bars, 12 sided bars and circular cross-section bars, wherein said circular cross-section bars have fiducial marks to indicate their magnetization directions.
3. The electric machine of claim 2, wherein said octagonal bars have a direction of magnetization that rotates 90 degrees when the angular position of said bars in said array rotates through 45 degrees.
4. The electric machine of claim 2, wherein said 12 sided bars have a magnetization that rotates 60 degrees as the angular position of said bars in said array rotates through 30 degrees.
5. The electric machine of claim 2, wherein said square bars have a magnetization that rotates 90 degrees as the angular position of said bars in said array rotates through 45 degrees.
6. The electric machine of claim 1, further comprising a circuit for providing energy to said electric machine, comprising:
   a regulator;
   wherein said commutating means comprise an electronic commutator electrically connected in parallel to said regulator; and
   wherein said windings are electrically connected to receive a direct current from said electronic commutator.
7. The electric machine of claim 6, wherein said regulator is a Buck regulator comprising in parallel:
   a source of DC voltage in series with an IGBT;
   a diode; and
   a capacitor;
   wherein said Buck regulator further comprises an inductor electrically connected between said capacitor and said diode.
8. The electric machine of claim 6, wherein said electronic commutator comprises three parallel branches, each branch comprising two series electrically connected opening switches selected from a group consisting of IGBTs, BJTs, FETs, GTOs, and MCTs;
   wherein said three electrically parallel branches are electrically connected in parallel with said regulator; and
   wherein said windings comprise three phases, one phase each of said three phases electrically connected between said two series electrically connected opening switches.
9. The electric machine of claim 8, wherein one said opening switch of each branch of said three electrically parallel branches is pulse width modulated to control current in said windings.

10. An electric machine, comprising:

a cylindrical rotor comprising an array of permanent magnets that provide a uniform dipole field with no necessity for the use of laminated iron, wherein said array of permanent magnets comprise bars of identical permanent magnets assembled in a circle, wherein said bars are dipole elements, each bar of said bars having a vector direction of magnetization that rotates at twice the rate as that of a vector rotating about said circle pointing from the center of said uniform dipole field to the center of said elements;

a stator inserted down the axis of said dipole field, said stator comprising windings; and wherein said rotor is on the outside of said stator.

11. The electric machine of claim 10, wherein said bars of identical permanent magnets are selected from a group consisting of square bars, octagonal bars, 12 sided bars and circular cross-section bars, wherein said circular cross-section bars have fiducial marks to indicate their magnetization directions.

12. The electric machine of claim 11, wherein said octagonal bars have a direction of magnetization that rotates 90 degrees when the angular position of said bar in said array rotates through 45 degrees.

13. The electric machine of claim 11, wherein said 12 sided bars have a direction of magnetization that rotates 60 degrees as the angular position of said bar in said array rotates through 30 degrees.

14. The electric machine of claim 11, wherein said square bars have a direction of magnetization that rotates 90 degrees as the angular position of said bar in said array rotates through 45 degrees.

15. The electric machine of claim 10, further comprising a circuit for extracting energy from said electric machine, comprising:

a regulator; and a diode bridge electrically connected in parallel to said regulator;

wherein said windings are electrically connected to provide current to said diode bridge.

16. The electric machine of claim 15, wherein said regulator comprises a boost regulator comprising in parallel:

a DC voltage source in series with a diode;

an IGBT; and a capacitor;

wherein said boost regulator further comprises an inductor electrically connected between said IGBT and said capacitor.

17. The electric machine of claim 15, wherein said diode bridge comprises three branches electrically connected in parallel with said regulator;

wherein each branch of said three branches comprises two diodes electrically connected in series;

wherein said windings comprise three phases, one phase each of said three phases electrically connected between said two series electrically connected diodes of said diode bridge.

18. The electric machine of claim 10, wherein said array of permanent magnets comprise a Halbach array.

19. The electric machine of claim 1, wherein said permanent magnets comprise NdFeB.

20. The electric machine of claim 1, wherein said commutating means comprise brushes.

21. The electric machine of claim 1, wherein said rotor is constructed using an eight segment Halbach array.

22. The electric machine of claim 1, wherein said permanent magnets comprise ceramic.

23. The electric machine of claim 1, wherein said windings are multiphase.

24. The electric machine of claim 1, wherein said windings are three phase.

25. The electric machine of claim 1, wherein said windings comprise Litz wire.

26. The electric machine of claim 1, wherein said windings comprise copper.

27. The electric machine of claim 1, further comprising a circuit comprising:

a Buck/Boost regulator; and wherein said commutating means comprise an electronic commutator electrically connected parallel to said Buck/Boost regulator, wherein said electronic commutator comprises three parallel branches, wherein each branch comprises two series connected opening switches with antiparallel diodes;

wherein said windings are electrically connected to said electronic commutator, wherein each phase of said windings are electrically connected to a different branch of said electronic commutator between each said two series connected opening switches.

28. The electric machine of claim 10, further comprising a circuit comprising:

a Buck/Boost regulator; and an electronic commutator electrically connected parallel to said Buck/Boost regulator, wherein said electronic commutator comprises three parallel branches, wherein each branch comprises two series connected opening switches with antiparallel diodes;

wherein said windings are electrically connected to said electronic commutator, wherein each phase of said windings are electrically connected to a different branch of said electronic commutator between each said two series connected opening switches.

* * * * *